United States Patent
Huang et al.

(10) Patent No.: US 9,619,946 B2
(45) Date of Patent: Apr. 11, 2017

(54) SECURELY PROVIDING DIAGNOSTIC DATA FROM A VEHICLE TO A REMOTE SERVER USING A DIAGNOSTIC TOOL

(71) Applicant: GM Global Technology Operations LLC, Detroit, MI (US)

(72) Inventors: Stephan Huang, Carmel, IN (US); David M. Nairn, Plymouth, MI (US); Muralikrishnan K, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 14/445,821

(22) Filed: Jul. 29, 2014

(65) Prior Publication Data
US 2016/0035148 A1 Feb. 4, 2016

(51) Int. Cl.
*G07C 5/00* (2006.01)
*H04L 9/08* (2006.01)

(52) U.S. Cl.
CPC ............ *G07C 5/008* (2013.01); *H04L 9/0866* (2013.01); *G07C 2205/02* (2013.01); *H04L 2209/84* (2013.01)

(58) Field of Classification Search
CPC ..................................................... G07C 5/008
USPC ......................................................... 701/31.4
See application file for complete search history.

(56) References Cited

U.S. PATENT DOCUMENTS

| | | | |
|---|---|---|---|
| 2008/0140278 A1* | 6/2008 | Breed | G07C 5/008 701/31.4 |
| 2009/0195370 A1* | 8/2009 | Huffman | B60R 25/04 340/426.13 |
| 2010/0042498 A1* | 2/2010 | Schalk | G06Q 30/0254 705/14.52 |
| 2012/0262283 A1* | 10/2012 | Biondo | G07C 5/085 340/425.5 |
| 2012/0309455 A1* | 12/2012 | Klose | B60L 11/1838 455/557 |
| 2012/0323577 A1* | 12/2012 | Correia | G10L 15/22 704/254 |
| 2013/0282227 A1* | 10/2013 | Chen | G07C 5/008 701/31.5 |
| 2014/0046800 A1* | 2/2014 | Chen | G06Q 30/0623 705/26.61 |
| 2014/0270158 A1* | 9/2014 | Peirce | H04L 9/0819 380/44 |

* cited by examiner

*Primary Examiner* — Rodney Butler
*Assistant Examiner* — Frederick Brushaber
(74) *Attorney, Agent, or Firm* — Christopher DeVries; Reising Ethington P.C.

(57) ABSTRACT

A communication system in a vehicle is described and various methods for securely providing diagnostic data between a vehicle and a remote server using a vehicle diagnostic tool. The method may include the steps of: receiving at the remote from the diagnostic tool both a challenge question and encrypted data acquired by the diagnostic tool from a vehicle electronic control unit; using the challenge question to determine how to decrypt the encrypted data; and decrypting the encrypted data at the remote server.

17 Claims, 4 Drawing Sheets

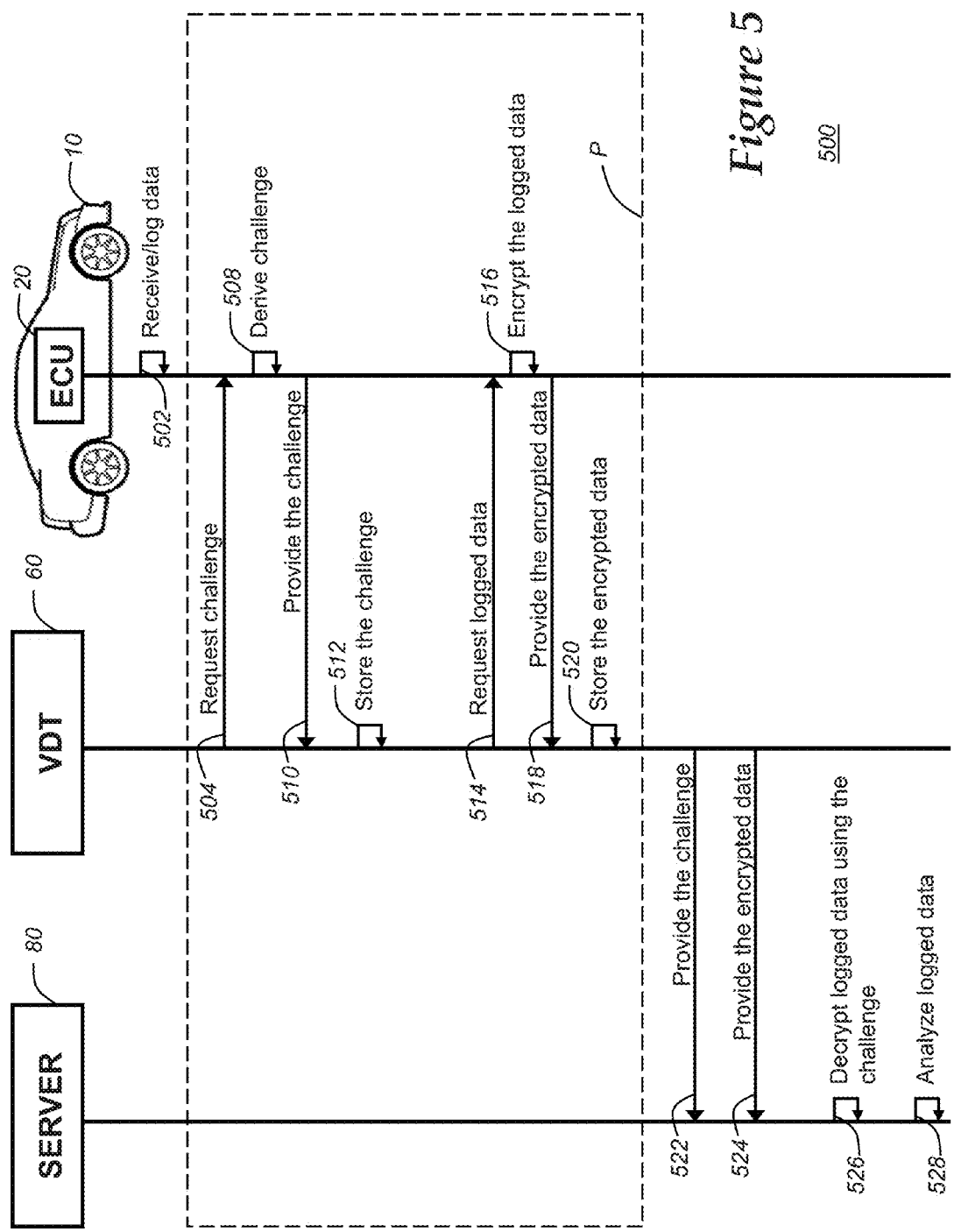

SECURELY PROVIDING DIAGNOSTIC DATA FROM A VEHICLE TO A REMOTE SERVER USING A DIAGNOSTIC TOOL

TECHNICAL FIELD

The present invention relates to providing diagnostic information from a vehicle electronic control unit to a remote computer using a diagnostic tool.

BACKGROUND

The International Standard Organization (ISO) is a recognized authority for industry standards. ISO-14229 specifies data link requirements of diagnostic services allowing a diagnostic tester or test equipment to control diagnostic functions in a vehicle electronic control unit (ECU); e.g., ECUs associated with electronic fuel injection, automated gear box assemblies, anti-lock braking systems, etc. When the diagnostic test equipment interfaces with one or more ECUs, the test equipment controls communication over the data link—e.g., whether the communication is to stop, pause, or resume.

SUMMARY

According to an embodiment of the invention, there is provided a method of securely providing diagnostic data between a vehicle and a remote server using a vehicle diagnostic tool (VDT). The method includes the steps of: receiving at the remote server from the VDT both a challenge question and encrypted data acquired by the VDT from a vehicle electronic control unit (ECU); using the challenge question to determine how to decrypt the encrypted data; and decrypting the encrypted data at the remote server.

According to an embodiment of the invention, there is provided a method of securely providing diagnostic data between a vehicle and a remote server using a vehicle diagnostic tool (VDT). The method includes the steps of: receiving from the VDT at a vehicle electronic control unit (ECU) a request for a challenge question associated with providing previously logged data; deriving at the ECU the challenge question; providing from the ECU to the VDT the challenge question for storage at the VDT until the VDT can provide the challenge question to the remote server at a first later time; receiving from the VDT a request for the previously logged data stored in memory of the ECU; encrypting the logged data; and providing from the ECU to the VDT the encrypted data for storage at the VDT until the VDT can provide the encrypted data to the remote server at a second later time when the remote server can use the challenge question to derive information to decrypt the encrypted data.

BRIEF DESCRIPTION OF THE DRAWINGS

One or more embodiments of the invention will hereinafter be described in conjunction with the appended drawings, wherein like designations denote like elements, and wherein:

FIG. 5 is a flow diagram illustrating a method of securely providing diagnostic information between a vehicle and a remote server using a vehicle diagnostic tool.

DETAILED DESCRIPTION OF THE ILLUSTRATED EMBODIMENT(S)

The method(s) described below pertain to vehicle security with respect to a vehicle diagnostics system. More particularly, the method(s) pertain to protecting or securing sensitive information stored and provided by electronic control units (ECUs) within the vehicle. This information may be vulnerable to malicious attack when the ECU has been unlocked by an authorized source (e.g., a vehicle diagnostic tool) and when the ECU provides the information to such a diagnostic tool. The ECUs are typically interconnected to one another and communicate with one another via a vehicle network (e.g., a bus using a controller area network (CAN) protocol). In addition, the ECUs may abide by and/or comply with a vehicle diagnostics protocol. More recently, malicious attackers have determined how to eavesdrop and intercept the sensitive information carried by or communicated by the ECU(s). As will be explained below, using this sensitive information, malicious attackers may access the vehicle without authorization, start the vehicle without authorization, control vehicle movement without authorization, or access a lawful user's private information without authorization, just to name a few examples.

The method(s) described below more particularly pertain to enhancing the security during the transmission of the sensitive information to the diagnostic tool. For example, a diagnostic tool may be used to do the following: connect (by wire or wirelessly) with a vehicle bus; attempt to gain authorization or access to an ECU; receive a challenge from the ECU; accurately respond to the challenge and receive access; query the ECU for sensitive or confidential information; and since the tool is authorized, receive the requested sensitive or confidential information. When this information is transmitted from the ECU to the diagnostic tool, it is conventionally unsecured from an eavesdropper. Thus, at this moment, a malicious attacker may acquire and improperly use the information. The method(s) discussed herein enhance the security of these types of diagnostic sessions by securing or protecting the sensitive information transmitted (e.g., via encryption). Moreover, instead of the diagnostic tool performing the decryption, the encrypted information is stored at the tool for later conveyance to a remote server for decryption and analysis. In this manner, no decryption keys need to be stored at the diagnostic tool—and in the event the tool is stolen or compromised, the sensitive information remains protected by encryption and the attacker has no decryption key to decrypt the information. In addition, the method(s) described herein enable secure storage of diagnostic readings in remote locations where internet or wireless connections are intermittent or absent.

Figure 1:
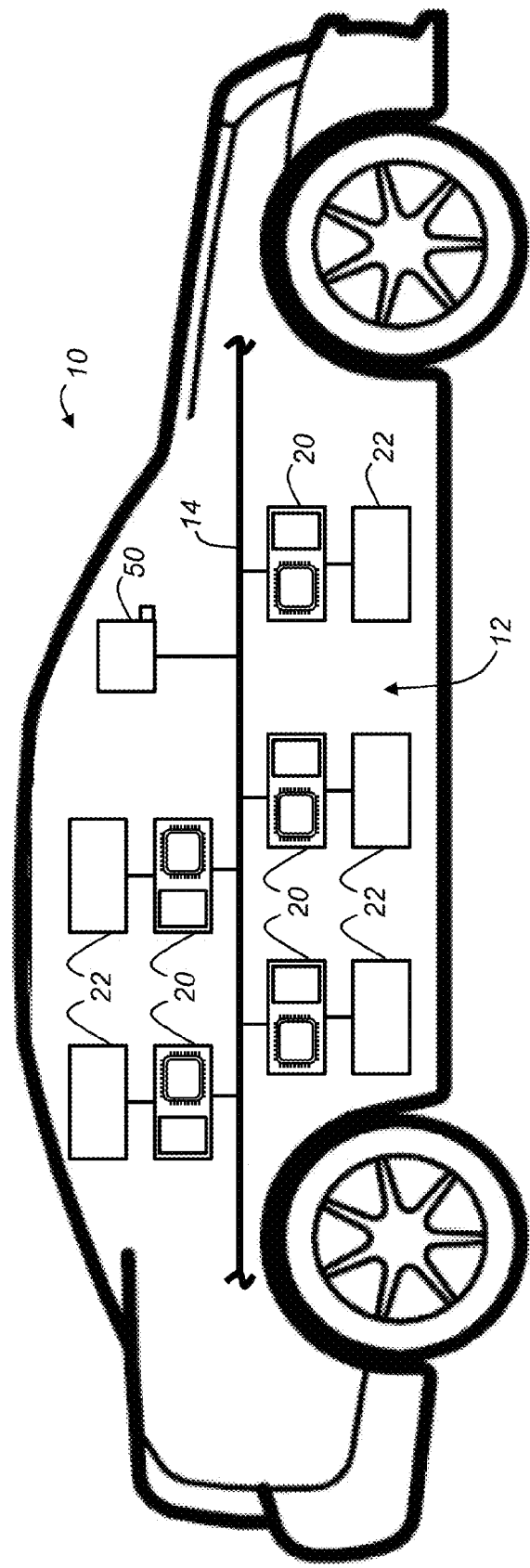
FIG. 1 is a block diagram depicting an embodiment of a communications system that is capable of utilizing the method disclosed herein.

FIG. 1 illustrates a vehicle 10 having a communication system 12 therein. The communication system 12 may enable wired communication via one or more vehicle buses 14, short range wireless communication (SRWC) using an SRWC chipset 16 (see FIG. 2), or long range, cellular communication using a cellular chipset 18 (see FIG. 2), just to name a few possibilities. The bus(es) 14 and SRWC equipment collectively may be implemented to enable a vehicle local area network (VLAN).

The one or more buses 14 may include communication bus(es), infotainment bus(es), entertainment bus(es), etc. The one or more buses 14 also may be considered diagnostic buses if they are suitably configured to carry diagnostic information stored in the ECUs—regardless of whether the bus(es) also carry other communication, infotainment, or entertainment data. The bus shown in FIG. 1 is connected directly and indirectly to multiple devices. For example, a number of ECUs (20) are coupled directly to the bus 14, which are in turn each coupled to a vehicle system module or vehicle module or device 22 (such that the ECUs bridges the connection between the bus 14 and devices 22). Together the bus(es) 14 and ECUs 20 communicate via one or more vehicle networks (e.g., suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few).

Figure 2:
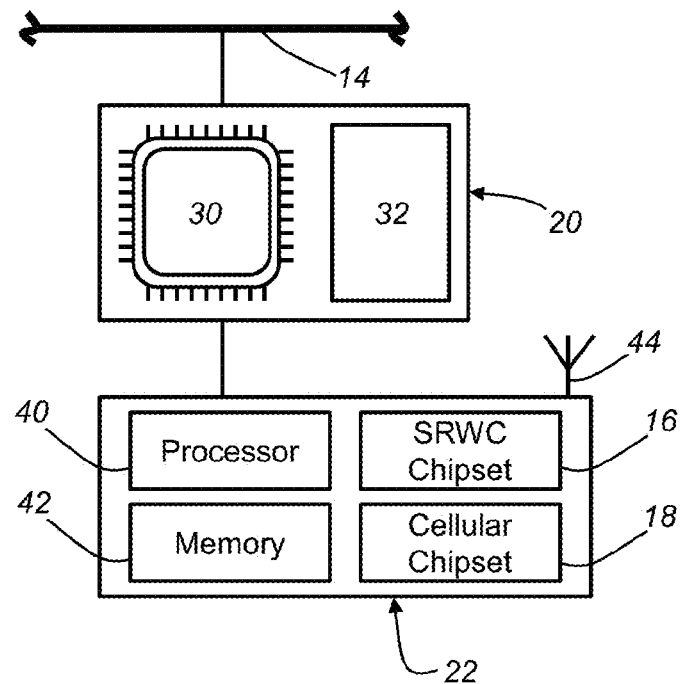
FIG. 2 is an embodiment of a portion of the vehicle communications system shown in FIG. 1.

Each ECU may comprise one or more processing devices or processors 30 and memory or memory devices 32 (see e.g., FIG. 2). Each processor 30 may be any type of device capable of processing electronic instructions including microprocessors, microcontrollers, host processors, controllers, vehicle communication processors, and application specific integrated circuits (ASICs). It can be a dedicated processor used only for the respective ECU (and/or its respective vehicle module 22) or it can be shared with other vehicle systems. Processor 30 executes various types of digitally-stored instructions, such as software or firmware programs stored in memory 32, which enable the vehicle module 22 to provide various services. For instance, processor 30 can execute programs or process data to carry out at least a part of the method discussed herein.

The memory 32 may include any suitable computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes.

Figure 3:
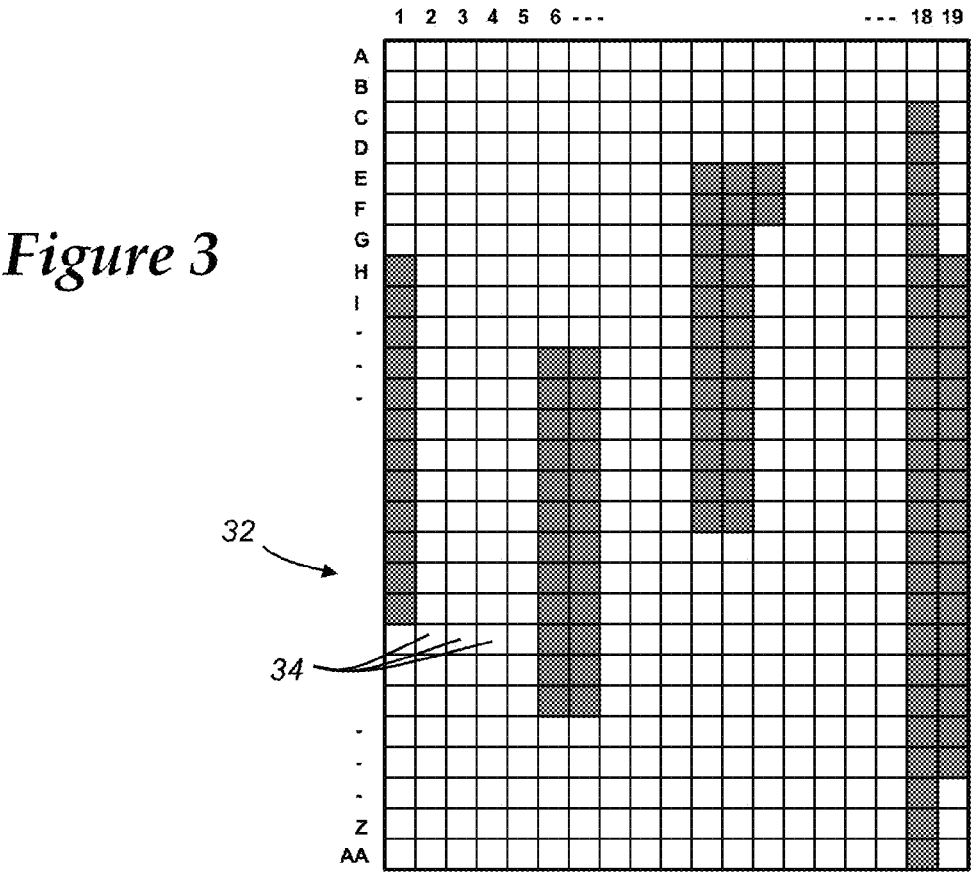
FIG. 3 is an embodiment of electronic control unit (ECU) memory.

According to one embodiment, the memory 32 may be categorized or divided into identifiable segments—each segments having or being associated with a cell or address 34 (see FIG. 3). FIG. 3 shows at least a portion of memory 32 having multiple addresses 34. For purposes of illustration only, FIG. 3 shows rows (indicated alphabetically, e.g., A-AA) and columns (indicated numerically, e.g., 1-19). These quantities of rows and columns are merely an example; other quantities exist. Moreover, other means of addressing the memory 32 also exist. As will be explained in greater detail below, memory 32 may carry or store both sensitive and non-sensitive data; e.g., in FIG. 3, the shaded addresses (e.g., H1, I1, J1, . . . , S1) may carry sensitive data, while the unshaded addresses (e.g., all of columns 2, 3, 4, and 5) may carry less or non-sensitive data.

It also should be appreciated that the processor 30 and memory 32 may be configured using hardware or software, and the method(s) described herein may be performed as one or more computer programs executable by the processor 30 and/or the vehicle module 22, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. It is therefore to be understood that the methods may be at least partially performed by any electronic device(s) capable of executing the above-described functions.

The vehicle modules 22 may be configured to execute various vehicle services. For example, one module may be an engine control module; another may be a powertrain control module. Or for example, one of the vehicle modules 22 may be a telematics unit (as shown in FIG. 2) having the previously mentioned SRWC and cellular chipsets 16, 18, as well as its own processor 40, memory 42, and multi-purpose (or multi-band) antenna 44—among other things. For example, using the SRWC chipset 16, the telematics unit may carry out wireless networking (via the VLAN) according to any suitable, known protocol. Non-limiting examples of SRWC protocols include a Wi-Fi standard (e.g., IEEE 802.11), a Wi-Fi Direct standard, a Bluetooth standard, a WiMAX standard, a ZigBee™ standard, a wireless infrared transmission standard, any other suitable standard, or various combinations thereof.

Of course, wireless networking by the telematics unit may be carried out according to any suitable cellular standard as well. For example, the telematics unit may communicate via GSM, CDMA, or LTE standards, just to name a few. Cellular communication should be construed broadly to include voice calls, data (or packet) calls, or any combination thereof.

The ECU 20 shown in FIG. 2 is coupled between the bus 14 and the telematics unit (one of the modules 22) and may be configured according to any suitable standard—e.g., a conventionally configured ECU; or it may be a dedicated, particularly or specially configured ECU. Thus, the ECU 20 shown in FIG. 2 is illustrative of any or all of the ECUs shown in FIG. 1. It should be appreciated that the ECU 20 may store sensitive data associated with communication over the bus 14 or sensitive data associated with the respective module 22 (e.g., the telematics unit) or both. For example, and as will be explained in greater detail below, the ECU 20 may store and utilize one or more encryption keys for secure bus communication or for communication between the ECU 20 and the respective module 22. Furthermore, skilled artisans will appreciate that a breach of ECU 20 may enable an attacker a suitable opportunity to acquire sensitive data stored within the module 22, enable the attacker to acquire physical access to the vehicle, and even harm the rightful user of the vehicle 10. For example, a breach of the ECU 20 shown in FIG. 2 may enable a malicious attacker opportunity to use the telematics unit to remotely start the vehicle or unlock the vehicle doors, etc.

Figure 4:
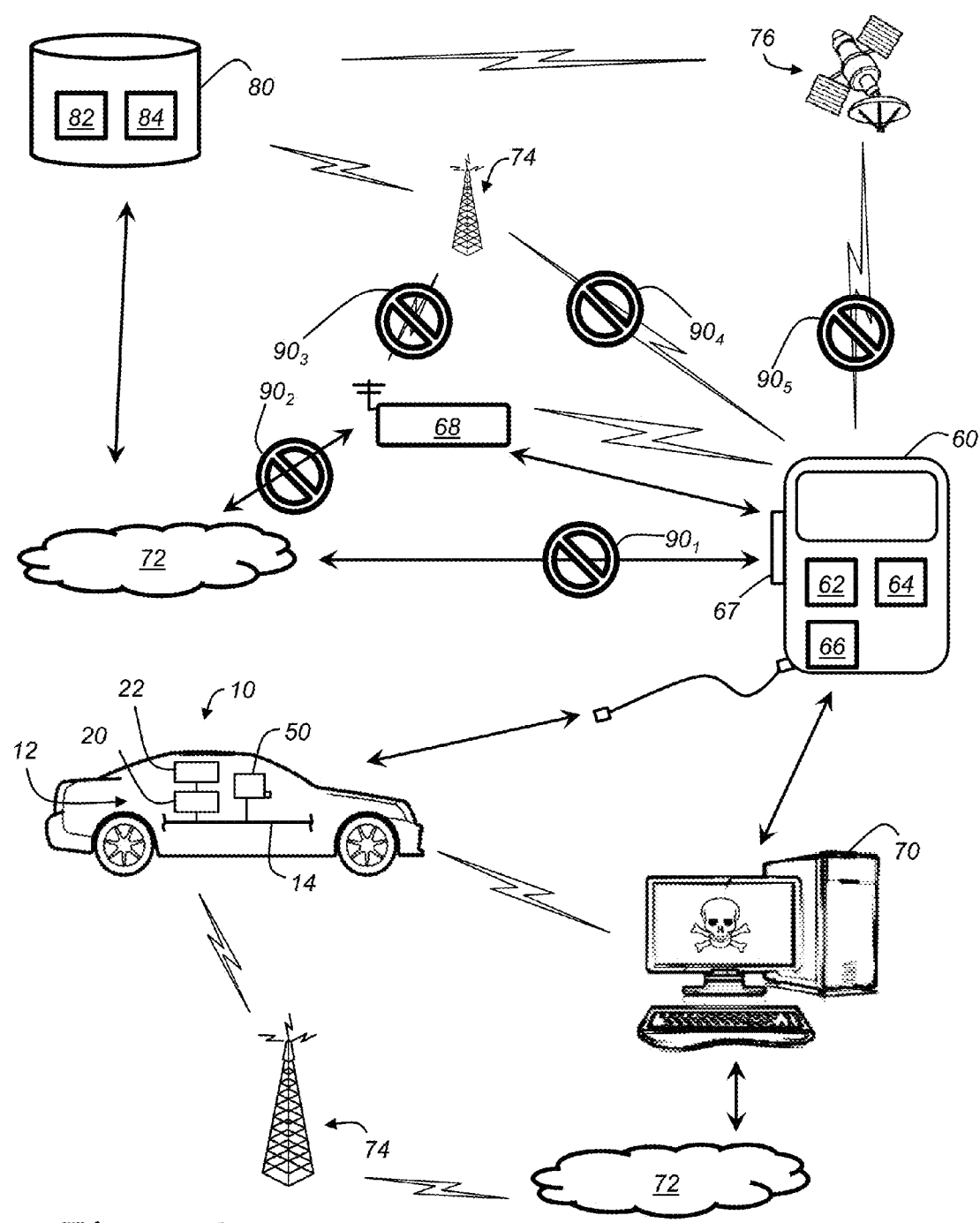
FIG. 4 is a schematic diagram depicting a diagnostics tool isolated from a diagnostic server and how a malicious attacker might breach the vehicle communications system of FIG. 1.

FIG. 4 (and also FIG. 1) show a diagnostic portal 50 coupled to the bus 14. The portal 50 may be any device for connecting or coupling an external device 60 such as a vehicle diagnostic tool (VDT) or data-logger or other suitable diagnostics machine. In addition, as will be explained in greater detail below, external devices 60 also may include electronic devices used by an attacker to imitate genuine diagnostic tools; e.g., a pseudo-diagnostic tool or remote computer. Genuine VDTs 60, as will be appreciated by skilled artisans, may enable a vehicle technician to connect with the vehicle 10, request diagnostic status, and read the statuses of multiple vehicle modules 22. The diagnostic request may include reading one or more memory addresses 34 (e.g., in accordance with ISO-14299). Where a technical issue or problem exists with a particular module, the status provided by the associated ECU 20 includes 'error' code data or a diagnostic trouble code (DTC). And where no issues exist, the status includes 'normal' code data. The external device 60 may couple by wire or wirelessly with the portal 50 using hardware and techniques familiar to skilled artisans.

FIG. 4 further illustrates that the VDT 60 may include one or more processors 62 in operable communication with memory 64; the memory 64 and processor(s) 62 may function similarly to those described with respect to memory 32 and processor 30 and will not be re-described. In at least one embodiment, the memory 64 and/or processor(s) 62 may be in communication with a wireless module 66 in the VDT. The module 66 may contain a cellular chipset, a SRWC chipset, and/or a satellite chipset enabling cellular communication (e.g., 3G, 4G, etc.), any suitable short range wireless communication (e.g., Wi-Fi, Wi-Fi Direct, Bluetooth, etc.), and/or GPS or other satellite communication, respectively. The VDT also may have one or more ports 67 (e.g., an Ethernet port, a fiber optic port, an firewire port, a USB port, etc.) for a wired connection to a wide area network (WAN) or an intermediary device 68 that is capable of cellular communication, SRWC, or satellite communication.

In one embodiment, the intermediary device 68 may be a particularly configured device to communicate with the VDT and then transmit by wire or wirelessly diagnostic data or services to a remote computer or server 80. As shown in FIG. 4, some embodiments of the VDT 60 may communicate with the server 80 (e.g., via cellular, SRWC, satellite, etc.); and some embodiments may use or require the intermediary device 68. In some implementations, the device 68 is necessary to transmit any diagnostics data to the server 80.

As shown in FIG. 4, the server 80 may be in communication with the VDT 60 using land network 72 or in a variety of ways. The remote server may be any computing device with a database or memory 84. In addition, the server 80 may include one or more processors 82. The memory 84 and processor(s) 82 may function similarly to those described with respect to memory 32 and processor 30 and will not be re-described here. Moreover, the term "remote" may be relative; e.g., it is remote from the VDT 60; i.e., it is not contained within or a part of the VDT 60 (or the intermediate device 68). Therefore, suitable examples include a server in another location or one in the same location as the VDT 60, just not physically part of the VDT 60. In one implementation, the remote server 80 is located at or associated with a vehicle call center—i.e., a facility providing a number of vehicle back-end services and functions and including switches, servers, databases, live advisors, etc., all of which are known in the art.

FIG. 4 further illustrates a few examples of how a malicious attacker 70 (represented by a networked device) might utilize the communication system 12 in the vehicle 10 to gain unauthorized access to or breach the system 12. For example, the attacker 70 may utilize the external device 60 or similar device which is directly coupled to the bus 14 (e.g., via wire or wireless communication). Or the attacker may spoof an external device 60—i.e., pretend to be a genuine diagnostic tool. Or the attacker 70 may utilize a land network 72 and/or a wireless network 74 to breach the bus 14 (e.g., via the telematics unit or other suitable module 22). In any case, once access to the bus 14 is achieved by the malicious attacker 70, the attacker may communicate with the ECUs 20 in order to gather sensitive information.

Now turning to FIG. 5, a flow diagram is shown illustrating a method 500 of securely providing diagnostic information between the vehicle 10 (e.g., the vehicle's ECU 20) and the remote server 80 using the VDT 60. The flow diagram shows a number of steps or transactions between one of the ECUs 20, the VDT 60, and the remote server 80.

The method begins at step 502 by receiving or logging diagnostic data that includes both sensitive (or confidential) and un-sensitive data. The data may be received from an associated vehicle module 22 and may be stored in various addresses 34 of memory 32 (e.g., shaded, sensitive addresses such as H1, I1, J1, . . . , S1).

After data is logged (step 502), the VDT 60 may connect with the bus 14 attempting to retrieve diagnostic data (e.g., from memory addresses 34). This connection may occur by wire or wirelessly. And in steps 504-512, the VDT 60 may acquire a challenge or challenge question from the ECU 20; thereafter, in steps 514-520, the VDT 60 may acquire the logged data. Moreover, steps 504-520 may all be performed during a period P of vehicle disconnectivity; e.g., in a remote location or during a time when internet or wireless connections are intermittent or absent. Thus, during period P, the VDT 60 may be unable to connect with the server 80 via the satellite(s) 76, wireless network 74, local computers (e.g., via the land network 72), or the intermediate device 68, or any other suitable means or device.

Period P is further illustrated in FIG. 4. The figure illustrates that there may be instances 90 when any connection between the VDT 60 (and/or the intermediary device 68) and the server 80 is not possible. For example, such instances include: no internet or local area wired connection $90_1$, no LAN connection $90_2$ or cellular connection $90_3$ of the intermediary device 68, no cellular connection $90_4$ of the VDT, no satellite connection $90_5$ of the VDT, just to name a few examples.

In step 504, during period P, the VDT 60 requests the challenge via the connection between the VDT 60 and the ECU 20.

In step 506, the ECU 20 may determine or derive the challenge in response to the request in step 504. The requested challenge may be in any suitable format. For example, the challenge may include components or parts, such as: an encryption key, a password or passphrase, a function or algorithm, a salt, a unique identifier (associated with the vehicle 10 or vehicle hardware such as a serial number, a MAC address, a vehicle identification number (VIN), a software version or update number, etc.), a hash, a randomly generated number (e.g., a seed), etc., or any combination thereof. In at least one embodiment, the challenge includes a combination of parts, wherein at least one of the parts is a seed value. And in at least one embodiment, the challenge includes a combination of parts, wherein at least one of the parts is a unique identifier.

In step 510, the ECU 20 may provide the challenge to the VDT via the connection.

In step 512, the VDT may store the challenge in VDT memory 64. This challenge, as will be explained below, may be stored for later delivery to the server 80.

In step 514, the VDT 60 may request logged data from the ECU 20. In at least one implementation, the request may be for sensitive or confidential data stored in memory addresses 34 (e.g., the shaded regions).

Following step 514, the ECU may retrieve the requested data from its memory 32 and encrypt the data with a key stored in or accessible to the ECU (step 516). The encryption may be performed using any suitable technique or encryption algorithm.

And following step 516, the ECU may provide the requested, logged data to the VDT 60 using the connection between the VDT and ECU—i.e., the now encrypted data (step 518).

Upon receipt of the encrypted data in step 518, the VDT 60 may store the encrypted data in its memory 64 for later delivery to the server 80 (in step 52); i.e., later delivery when the VDT 60 has any suitable communication means for providing the stored challenge and stored encrypted (logged) data. This may require a change in the VDT's location or merely a passage of time (or both) so that a connection between the VDT and server may be established.

The storage of the encrypted (and potentially sensitive) data on the VDT 60 may be suitable for regions or countries having inadequate or intermittent long range communication (e.g., absent land-based or wireless connections). Moreover, by saving the data on the VDT 60, even if the VDT is lost, stolen, or breached, the data is encrypted and unaccessible. Moreover, it will be appreciated that the means for decrypting the stored data does not accompany the VDT 60; e.g., the VDT does not store a key required to decrypt the stored data nor the means for decoding the challenge. Therefore, these security tools are not available to the malicious party attempting a breach of the VDT.

Following steps 504-520 (period P), the VDT 60 may be in a location or circumstance when connectivity to the server 80 is possible. During this connectivity, the VDT 60 may provide the challenge or challenge question (step 522) and the encrypted data (step 524) to the server 80. Thus, the challenge and encrypted data now may be conveyed by any number of means (e.g., cellular, internet, satellite, etc.).

In step 526, the remote server 80 may decrypt the encrypted, logged data (received in step 524) using the challenge (received in step 522). According to one embodiment, the challenge may be used to derive or identify a decryption key that may be used to decrypt the encrypted data. The decryption key may be stored at the server 80 (e.g., on memory 84). For example, where the challenge includes an identifier, the identifier may be associated with the decryption key. In at least one embodiment, the key used to encrypt the data at the ECU 20 and the key used to decrypt the data at the server 80 are symmetric. For example, the vehicle and/or ECU 20 may be provided the key at the time of manufacture or any other suitably authorized service personnel.

And in step 528, the remote server 80 may analyze the now-decrypted data to improve the vehicle's 10 performance. In addition, this data may be used in some instances to improve multiple vehicles' performance and/or improve the users' experiences. For example, the method 500 may be performed for multiple vehicles and the data may be analyzed for trends and/or similar diagnostic trouble codes (DTCs), etc. The collective data may be used to identify problems in a particular make and/or model more quickly and efficiently.

Thus, there has been disclosed method(s) for securely providing diagnostic information between a vehicle and a remote server using a diagnostic tool. In the method(s), the diagnostic tool acquires sensitive or confidential information from one or more vehicle electronic control units (ECUs). The method inhibits any breach of the diagnostic tool from yielding the sensitive information as the information is encrypted and the means for decrypting the information is not present on the tool (e.g., a decryption key is not stored thereon). Moreover, the decryption key is known by the remote server. The method enables the server to acquire sensitive information from the vehicle using the diagnostic tool in the absence of an internet or wireless connection at the time the tool is connected to the vehicle—which may be particularly beneficial in less developed areas of the country and world.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of securely providing diagnostic data between a vehicle and a remote server using a vehicle diagnostic tool (VDT), comprising the steps of:
   (a) receiving at the remote server from the VDT both a challenge question and data encrypted by a vehicle electronic control unit (ECU) using an encryption key, wherein the VDT receives the encrypted data from the vehicle ECU;
   (b) using the challenge question to determine how to decrypt the encrypted data; and
   (c) decrypting the encrypted data at the remote server using the encryption key.

2. The method of claim 1, wherein the acquisition by the VDT in step (a) includes:
   (a1) receiving the challenge question during a VDT-ECU connection by sending a first request from the VDT to the ECU;
   (a2) receiving the encrypted data during the VDT-ECU connection by sending a second request from the VDT to the ECU.

3. The method of claim 2, wherein, in response to receiving the first request, the ECU derives the challenge question.

4. The method of claim 3, wherein the derivation of the challenge question includes using at least one of: an encryption key, a password, a passphrase, a function, a salt, a unique identifier, a hash, or a randomly generated number.

5. The method of claim 2, wherein, in response to receiving the second request, the ECU encrypts previously logged data.

6. The method of claim 2, wherein the encrypted data is encrypted by ECU using a key stored at the ECU.

7. The method of claim 1, wherein step (b) further comprises identifying the vehicle, the ECU, or both based on the challenge question.

8. The method of claim 7, wherein, based on the identification, determining a key to decrypt the encrypted data in step (c).

9. The method of claim 8, wherein the key used to decrypt the encrypted data is symmetric to a key used in the ECU to encrypt the encrypted data.

10. The method of claim 1, further comprising: (d) analyzing the previously encrypted data.

11. The method of claim 10, further comprising:
 (e) performing steps (a)-(d) for a plurality of other vehicles;
 (f) analyzing at the remote server the previously encrypted data received from the plurality of other vehicles; and
 (g) using the data of steps (d) and (f), determining diagnostic trouble codes (DTCs).

12. The method of claim 1, wherein the remote server is associated with a vehicle call center.

13. A method of securely providing diagnostic data between a vehicle and a remote server using a vehicle diagnostic tool (VDT), comprising the steps of:
 (a) receiving from the VDT at a vehicle electronic control unit (ECU) a request for a challenge question associated with providing previously logged data
 (b) deriving at the ECU the challenge question;
 (c) providing from the ECU to the VDT the challenge question for storage at the VDT until the VDT can provide the challenge question to the remote server at a first later time;
 (d) receiving from the VDT a request for the previously logged data stored in memory of the ECU;
 (e) encrypting the logged data using an encryption key; and
 (f) providing from the ECU to the VDT the encrypted data for storage at the VDT until the VDT can provide the encrypted data to the remote server at a second later time when the remote server can use the challenge question to derive information to decrypt the encrypted data.

14. The method of claim 13, wherein the first later time approximates the second later time.

15. The method of claim 13, further comprising: (g) analyzing at the remote server the decrypted data.

16. The method of claim 15, further comprising:
 (g) similarly decrypting data received from a plurality of other vehicles;
 (h) analyzing at the remote server the data decrypted in steps (f) and (g); and
 (h) using the decrypted data of step (h) to determine diagnostic trouble codes (DTCs) among the vehicle and the plurality of other vehicles.

17. The method of claim 13, wherein the remote server is associated with a vehicle call center.

* * * * *